United States Patent
Gim

(10) Patent No.: US 10,753,413 B2
(45) Date of Patent: Aug. 25, 2020

(54) S-CAM BRAKE OF HORIZONTAL TRANSFERRING FORCE TYPE

(71) Applicants: Hyundai Motor Company, Seoul (KR); Kia Motors Corporation, Seoul (KR)

(72) Inventor: Hyeong-U Gim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/210,884

(22) Filed: Dec. 5, 2018

(65) Prior Publication Data

US 2019/0331182 A1 Oct. 31, 2019

(30) Foreign Application Priority Data

Apr. 30, 2018 (KR) .................. 10-2018-0049561

(51) Int. Cl.
*F16D 51/22* (2006.01)
*F16D 65/22* (2006.01)
*F16D 65/38* (2006.01)
*F16D 125/30* (2012.01)

(52) U.S. Cl.
CPC .............. *F16D 65/22* (2013.01); *F16D 51/22* (2013.01); *F16D 65/38* (2013.01); *F16D 2125/30* (2013.01)

(58) Field of Classification Search
CPC ........... F16D 65/08; F16D 65/22; F16D 51/28
USPC ........................................ 188/78, 323–332
See application file for complete search history.

(56) References Cited

U.S. PATENT DOCUMENTS

| | | | | |
|---|---|---|---|---|
| 3,096,856 A | * | 7/1963 | Burnett | F16D 65/22 188/332 |
| 4,260,042 A | * | 4/1981 | Szalai | F16D 65/22 188/330 |
| 4,905,800 A | * | 3/1990 | Mathews | F16D 65/22 188/329 |
| 5,310,028 A | * | 5/1994 | Sampson | F16D 65/22 188/329 |
| 2011/0011687 A1 | * | 1/2011 | Gibson | F16C 33/04 188/329 |
| 2011/0278112 A1 | | 11/2011 | Norman et al. | |
| 2015/0167765 A1 | | 6/2015 | Plantan | |
| 2016/0121857 A1 | | 5/2016 | Berwanger | |
| 2016/0123414 A1 | | 5/2016 | Benwanger | |

FOREIGN PATENT DOCUMENTS

| | | |
|---|---|---|
| CN | 2384032 Y | 6/2000 |
| CN | 2545425 Y | 4/2003 |
| CN | 103047320 A | 4/2013 |
| CN | 203784160 U | 8/2014 |

(Continued)

*Primary Examiner* — Christopher P Schwartz
(74) *Attorney, Agent, or Firm* — Mintz Levin Cohn Ferris Glovsky and Popeo, P.C.; Peter F. Corless

(57) ABSTRACT

An S-cam brake includes an S-cam unit for braking a drum, where the S-cam unit includes an S-cam of an "S" shape having an involute tooth profile at left and right sides thereof, and horizontal tangential members forming contacting surfaces engaged with the involute tooth profile symmetrically around a center point of a circle at the left and right sides of the S-cam, and being spread at the left and right sides with normal lines of the contacting surfaces as a horizontal direction when the S-cam rotates.

15 Claims, 6 Drawing Sheets

(56) References Cited

FOREIGN PATENT DOCUMENTS

| | | |
|---|---|---|
| CN | 205173295 U | 4/2016 |
| JP | S56-59038 A | 5/1981 |
| JP | H03177630 A | 8/1991 |
| JP | H04248029 A | 9/1992 |
| JP | 2006-250252 A | 9/2006 |
| KR | 10-2000-0047479 A | 7/2000 |
| WO | 2010/051678 A1 | 5/2010 |

* cited by examiner

S-CAM BRAKE OF HORIZONTAL TRANSFERRING FORCE TYPE

CROSS-REFERENCE TO RELATED APPLICATION

The present application claims under 35 U.S.C. § 119(a) the benefit of Korean Patent Application No. 10-2018-0049561 filed on Apr. 30, 2018, the entire contents of which are incorporated by reference herein.

BACKGROUND

(a) Technical Field

The present disclosure relates to an S-cam brake of a horizontal transferring force type, more particularly, to the S-cam brake in which horizontal expansion of a shoe for braking is achieved by a horizontal transferring force of an S-cam (i.e., an S-shaped cam).

(b) Description of the Related Art

In general, an S-cam brake uses torque of an S-cam by compressed air supplied during brake pedal operation to form a braking force of the vehicle.

For example, the S-cam brake typically includes a lining-padded shoe web, the S-cam moving with a slack adjuster pushed into a brake chamber that receives a compressed air supply during braking, a roller that pushes left and right shoe webs at left and right sides of the S-cam, respectively, with a diagonal S-cam transfer force when the S-cam rotates, and a drum that generates braking through friction with a lining by a push of the shoe webs.

Typically, the S-cam has an involute tooth profile, thereby keeping a transfer force constant that is applied to the roller when an S-cam shaft rotates by the slack adjuster in order to gain a friction force by expanding the rollers disposed at both sides thereof.

Therefore, the S-cam brake has been mainly applied to a large commercial vehicle by ensuring braking safety without frictional force deviation of the left and right linings to the drum through uniform push of the left and right shoe webs by rotation of the S-cam.

However, since the rotation of the S-cam forms the transfer force with respect to the roller in a diagonal direction (that is, a slant direction with respect to the normal direction of the S-cam and the roller) not in a horizontal direction (that is, a normal direction with respect to an inner tangential line of the S-cam and the roller) so that the transfer force of a diagonal direction requires the same rotating direction of the S-cam and the drum.

Therefore, when the rotating directions of the S-cam and the drum are inconsistent, the transfer force of the diagonal direction applied to the roller generates sprag slip, which reaches a friction coefficient at a small friction angle, resulting in a sudden increase in frictional force momentarily.

The reason for this is that the sprag slip has a friction mechanism that changes the friction force according to the angle of force applied to the friction surface.

As a result, a change in the periodical excitation force due to rotation direction inconsistency of the S-cam and the drum generates a structural transmission sound through the S-cam brake structure, and the structural transmission sound is converted to a severe low frequency noise of about 105 to 110 dB.

The foregoing is intended merely to aid in the understanding of the background of the present disclosure, and is not intended to mean that the present disclosure falls within the purview of the related art that is already known to those skilled in the art.

SUMMARY

The present disclosure provides an S-cam brake of a horizontal transferring force type capable of causing a transferring force of an S-cam to be horizontal such that a rotating force of the S-cam is transmitted in a horizontal direction coinciding with a normal line of a contact surface, and thereby eliminating through the horizontal transferring force of the S-cam the occurrence of sprag slip developed with extreme low frequency noise when the rotating directions of the S-cam and a drum are inconsistent.

The S-cam brake of the present disclosure may include an S-cam unit for braking a drum. The S-cam unit may include an S-cam of an "S" shape having an involute tooth profile at left and right sides thereof; and horizontal tangential members forming contacting surfaces engaged with the involute tooth profile symmetrically around a center point of a circle at the left and right sides of the S-cam, and being spread at the left and right sides with normal lines of the contacting surfaces as a horizontal direction when the S-cam rotates.

As an exemplary embodiment, the horizontal tangential members may form the horizontal direction by the involute tooth profile formed at left and right surfaces thereof, an upper center hole and a lower center hole may be drilled in the horizontal tangential members at an interval so that the horizontal tangential members are arranged symmetrically with respect to the center of the interval, and a fixing member may be fastened to each of the upper center hole and the lower center hole.

As an exemplary embodiment, the horizontal tangential members may be divided into a left involute cam and a right involute cam; the left involute cam may form the contacting surface at the left side of the S-cam; the right involute cam may form the contacting surface at the right side of the S-cam; and each of the positions of the left involute cam and the right involute cam is upwardly and downwardly distinguished with respect to the center of the S-cam.

As an exemplary embodiment, the horizontal tangential members may form the horizontal direction by the involute tooth profile formed at one side surface thereof; a cut-off surface may be formed on an opposite side surface not forming the involute tooth profile; an upper center hole and a lower center hole may be drilled in the horizontal tangential members at an interval; and the upper center hole and the lower center hole may be positioned inside the cut-off surface; a fixing member may be fastened to each of the upper center hole and the lower center hole.

As an exemplary embodiment, the horizontal tangential members may be divided into a left variant involute cam and a right variant involute cam; the left variant involute cam may form the contacting surface at the left side of the S-cam; the right variant involute cam may form the contacting surface at the right side of the S-cam; each of the positions of the left variant involute cam and the right variant involute cam may be upwardly and downwardly distinguished with respect to the center of the S-cam; and the horizontal tangential members may form the horizontal direction by the circular exterior diameter.

As an exemplary embodiment, the horizontal tangential members may be divided into a left roller and a right roller; the left roller may form the contacting surface at the left side of the S-cam; and the right roller may form the contacting surface at the right side of the S-cam; and each of the positions of the left roller and the right roller may be upwardly and downwardly distinguished with respect to the center of the S-cam.

As an exemplary embodiment, the S-cam may be engaged with a slack adjuster through a cam pin; the cam pin may act as a rotation center of the S-cam by movement of the slack adjuster; and the slack adjuster may be operated as a brake chamber receiving the supply of compress air when a brake pedal is operated.

As an exemplary embodiment, the horizontal tangential members may form the contacting surfaces without protruding beyond the abrasion limit line of a lining provided at the drum.

The S-cam brake of the present disclosure may realize the following actions and effects by the horizontal transferring force of the S-cam with respect to the horizontal expansion of the shoe.

First, the noise problem of the S-cam brake may be improved itself on the S-cam brake without changing the mass and stiffness of a transmission/resonance system of a vehicle.

Second, there is no sprag slip through the S-cam even in a case of the S-cam brake operation in the backward travel of the vehicle resulting in S-cam and drum rotating direction mismatch.

Third, extreme low frequency noise due to the change of periodic excitation power may be greatly improved by not generating the slag slip.

Fourth, the elimination of extreme low frequency noise problems may significantly reduce the cost of quality claims due to noise in the S-cam brake, such as a pneumatic wedge brake and a hydraulic pressure cylinder brake.

Fifth, the horizontal transferring force of the S-cam in the S-cam brake may be implemented in various ways such as using the involute basic diameter position or using the asymmetric involute cam or asymmetric roller.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Hereinafter, exemplary embodiments of the present disclosure will be described in detail with reference to the accompanying drawings. These embodiments are to be considered as illustrative and not restrictive, as those skilled in the art will readily appreciate that various modifications, additions and substitutions are possible, without departing from the scope and spirit of the disclosure as disclosed in the accompanying claims.

Figure 1:
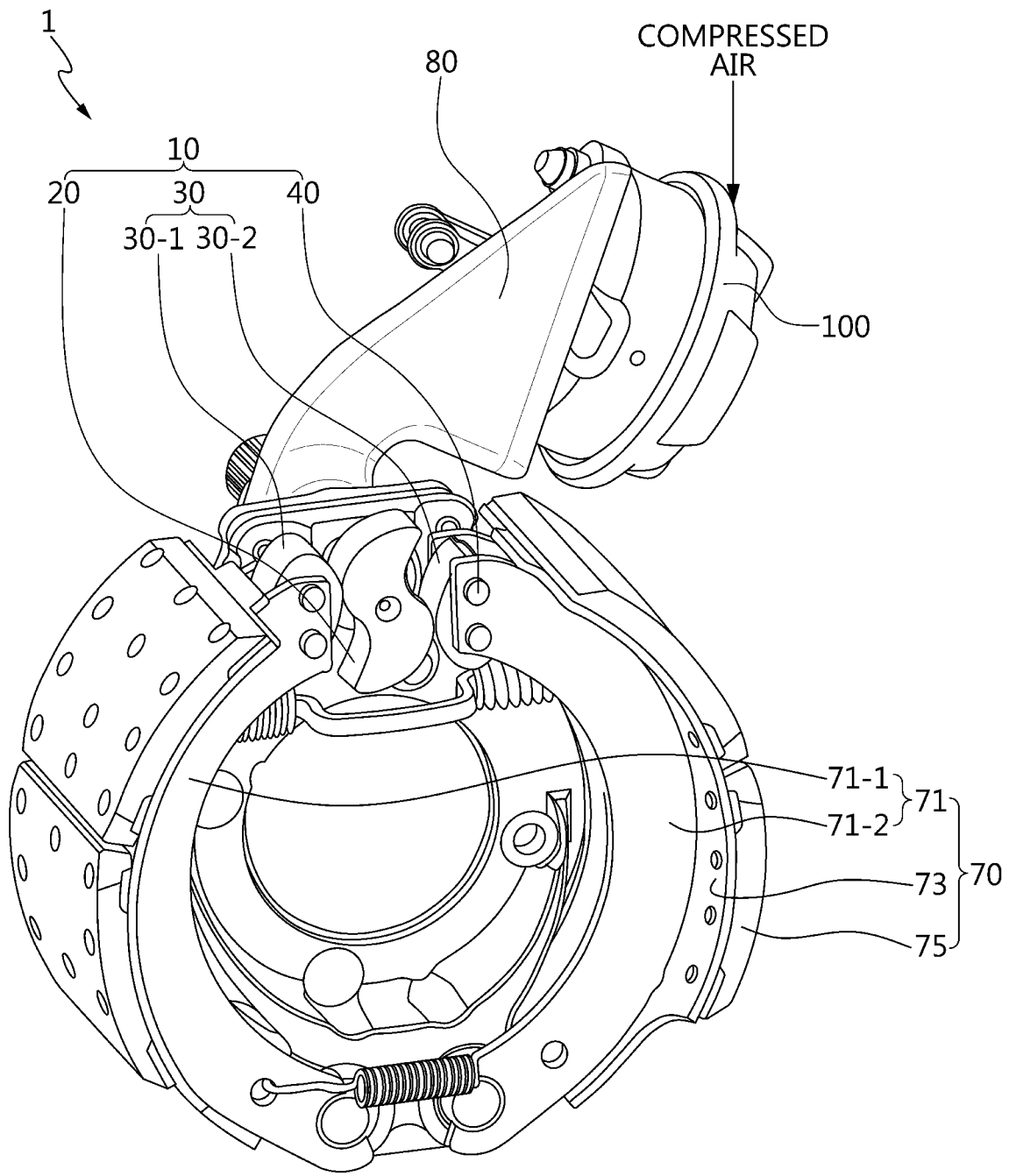
FIG. 1 is a schematic diagram of an S-cam brake of a horizontal transferring force type according to the present disclosure.

Referring to FIG. 1, an S-cam brake 1 may include an S-cam unit 10, a drum 70, a slack adjuster 80 and a brake chamber 100.

For example, the S-cam unit 10 may include an S-cam 20 having an involute tooth profile and formed in an "S"-shape, a horizontal tangential member 30 positioned on the right and left of the S-cam 20 as a pair of left and right involute cams 30-1 and 30-2 having the involute tooth profile, and a fixing member 40 serving as a rotation center while fixing the left and right involute cams 30-1 and 30-2.

For example, the drum 70 may include a shoe web 71, a rim 73 and a lining 75. The shoe web 71 may be coupled to the involute cams to be spread by motions of the involute cams, the rim 73 may be coupled to the shoe web 71 to be spread with the shoe web 71, and the lining 75 may be coupled to the rim 73 to be spread with the rim 73. Particularly, since the shoe web 71 is divided into left and right shoe webs 71-1 and 71-2 facing each other with the S-cam unit 10 therebetween, the rim 73 and the lining 75 may be also formed in pairs in responding to those. In this case, the left shoe web 71-1 may be coupled to the left involute cam 30-1 to be spread by motion of the left involute cam 30-1, and the right shoe web 71-2 may be coupled to the right involute cam 30-2 to be spread by motion of the right involute cam 30-2.

Therefore, the drum 70 may be configured the same as the conventional drum configuration applied to the S-cam brake 1.

For example, the slack adjuster 80 and the brake chamber 100 may be coupled to each other. The slack adjuster 80 is operated through the brake chamber 100 to rotate the S-cam 20 coupled thereto. The brake chamber 100 receives the compressed air generated in the pneumatic device when a brake pedal is operated to push a chamber push rod connected to a slack adjuster 60, and the chamber push rod pushes the slack adjuster 60 to generate the motion of the slack adjuster 80 which rotates the S-cam 20.

Therefore, the slack adjuster 80 and the brake chamber 100 are identical to the conventional slack adjuster and brake chamber configurations applied to the S-cam brake 1.

Figure 2:
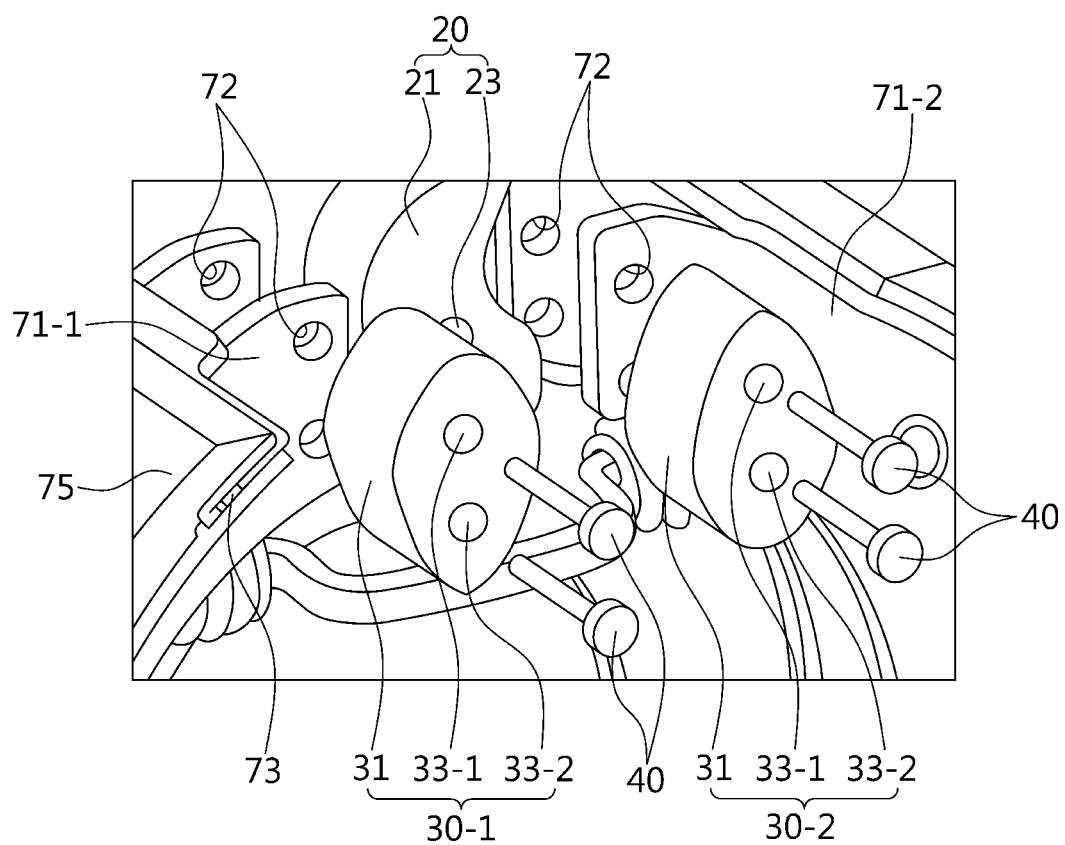
FIG. 2 is a detailed schematic diagram of an S-cam unit according to the present disclosure.

FIG. 2 illustrates the detailed structure of the S-cam 20, the horizontal tangential member 30 and the fixing member 40.

In particular, the S-cam 20 may be formed of an S-cam profile body 21 of an "S" shape having an involute tooth shape, and the S-cam profile body 21 may be coupled with a cam pin 23 at its center position so that the S-cam profile body 21 is rotated with the cam pin 23 as the rotational center when the S-cam 20 rotates. Therefore, the S-cam 20 is the same as the conventional S-cam applied to the S-cam brake 1.

Further, the horizontal tangential member 30 may be constructed as a pair of the left involute cam 30-1 and the right involute cam 30-2, and each of the left involute cam 30-1 and the right involute cam 30-2 may have an involute cam profile body 31, an upper center hole 33-1 and a lower center hole 33-2.

For example, the involute cam profile body 31 may be formed in an egg shape with an involute tooth profile. The upper center hole 33-1 may be drilled in the upper portion relative to the central position of the involute cam profile body 31, and the lower center hole 33-2 may be drilled in the lower portion relative to the central position of the involute cam profile body 31. Thus, the egg shape of the involute cam profile body 31 forms up-down and left-right symmetry about its center.

Specifically, the fixing member 40 may be formed of a pin or a bolt and coupled to the upper center hole 33-1 and the lower center hole 33-2 of the left involute cam 30-1 and the right involute cam 30-2. For this, a fastening hole 72 may be drilled in "U"-shaped portions of the left shoe web 71-1 and the right shoe web 71-2.

Therefore, the fixing member 40 may be inserted into the fastening hole 72, the upper center hole 33-1 and the lower center hole 33-2, thereby fixing each of the left involute cam 30-1 and the right involute cam 30-2 inserted into the "U"-shaped portions of the left shoe web 71-1 and the right shoe web 71-2, respectively.

Figure 3:
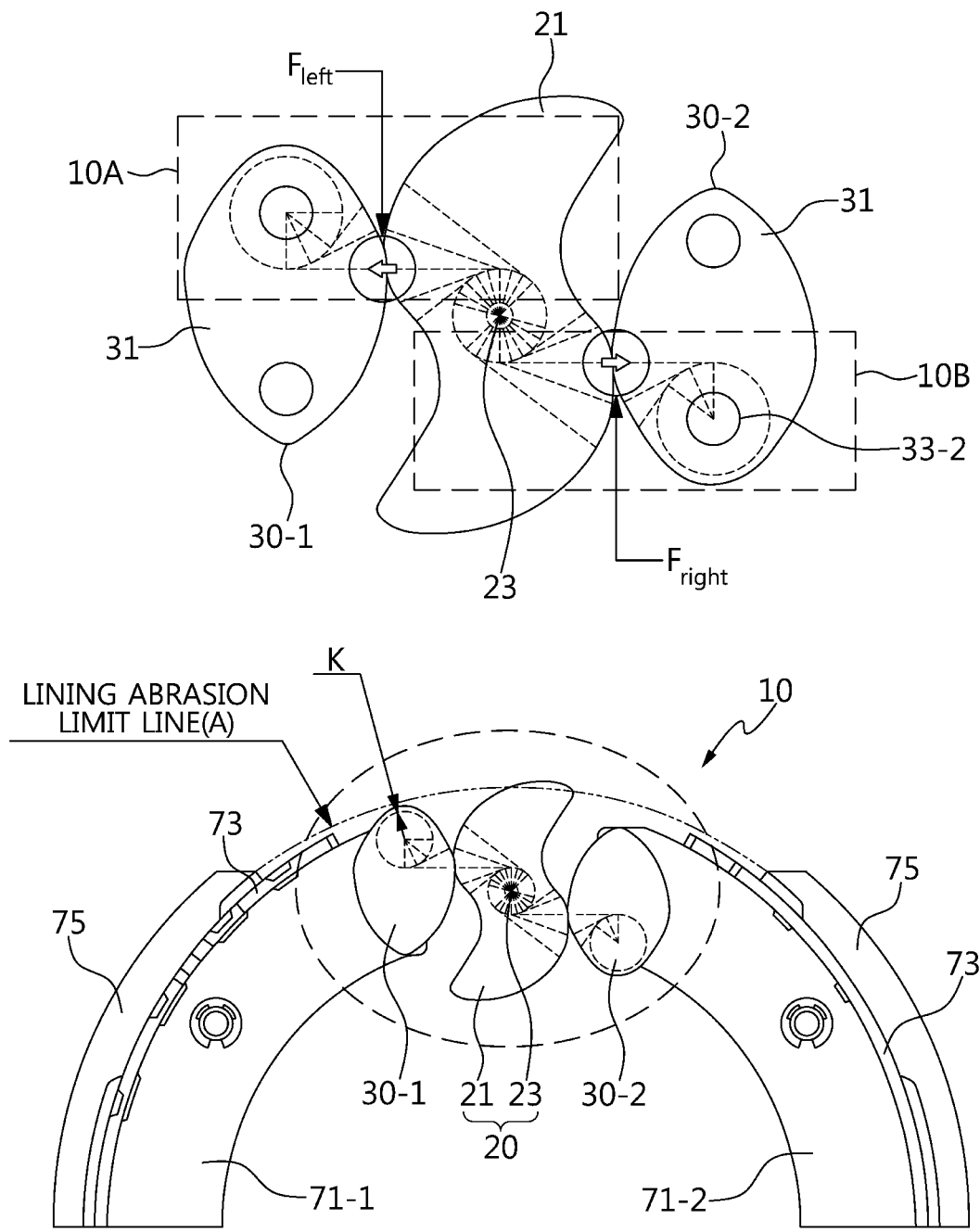
FIG. 3 is a layout example of an S-cam and an involute cam forming the S-cam unit according to the present disclosure.

FIG. 3 shows a layout formed by the S-cam 20 and the horizontal tangential member 30.

As shown in FIG. 3, the S-cam 20 may be located between the left involute cam 30-1 and the right involute cam 30-2. Further, the left involute cam 30-1 and the right involute cam 30-2 are each mounted symmetrically with respect to the circle center of the S-cam 20 so that the common inner tangential lines of base circles of the left involute cam 30-1 and the right involute cam 30-2 and the S-cam 20 can be horizontal. Particularly, the left involute cam 30-1 and the right involute cam 30-2 may be mounted so as not to protrude beyond the lining abrasion threshold line A for the lining 75 by forming an involute cam gap K.

In particular, the involute tooth profile of the S-cam 20 may be formed as a path of a tangent line (see, e.g., broken line in FIG. 3) using the virtual center circle of the cam pin 23, and the involute tooth profiles of the left involute cam 30-1 and the right involute cam 30-2 may be formed as paths of tangent lines (see, e.g., broken line in FIG. 3) using the virtual center circles of each of the upper and lower center holes 33-1 and 33-2. In addition, a left profile contacting portion 10A of the S-cam 20 and the left involute cam 30-1 and a right profile contacting portion 10B of the S-cam 20 and the right involute cam 30-2 are connected with each other through involute tooth profiles so that normal lines of the two connecting surfaces can be formed in a horizontal direction. At this case, the horizontal direction may be defined as a horizontal line parallel to the virtual horizontal line drawn for cam pin 23 of S-cam 20.

Thus, when setting the cam pin 23 to the center of the S-cam 20, the left involute cam 30-1 forms the left profile contacting portion 10A with respect to the S-cam 20 above the center, whereas the right involute cam 30-2 forms the right profile contact portion 10B with respect to the S-cam 20 below the center.

Figure 4:
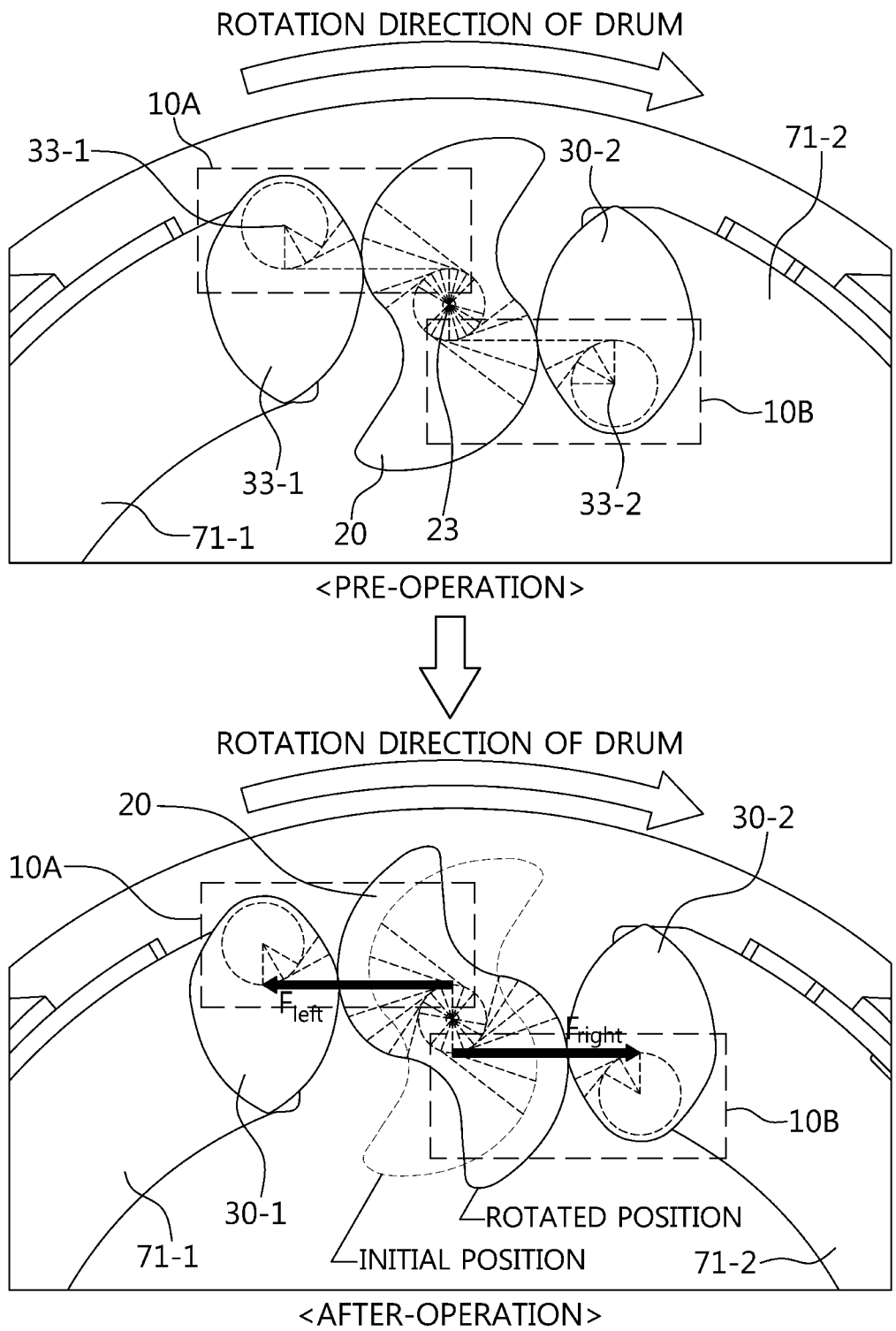
FIG. 4 shows that the horizontal transferring force of the S-cam and involute cams is maintained during an S-cam brake operation according to the present disclosure.

FIG. 4 shows an example in which the operations of the S-cam 20 and the horizontal tangential member 30 are divided into "pre-operation" and "after operation".

Referring to "pre-operation", the S-cam unit 10 may form a transferring direction of the force of two involute teeth engaged through the left profile contacting portion 10A and the right profile contacting portion 10B, the transferring direction of the force may be the same as the common tangent line of the two basic circles by the S-cam 20 and the left involute cam 30-1 and as the common tangent line of the two basic circles by the S-cam 20 and the right involute cam 30-2.

As a result, the involute basic circle of the S-cam 20 and the involute basic circles of the left involute cam 30-1 and the right involute cam 30-2 may form the horizontal common tangential lines, so that with the horizontal common tangential line, the torque of the S-cam 20 can be transmitted in the horizontal direction to each of the left involute cam 30-1 and the right involute cam 30-2.

Referring to "after-operation", the S-cam 20 rotated by the movement of the slack adjuster 80 may be switched from the initial position (see, e.g., broken line in FIG. 4) to the rotated position rotated anticlockwise. Then, the left applying pressure Fleft generated at the left profile contacting portion 10A of the S-cam 20 and the left involute cam 30-1 and a right applying pressure Fright generated from the right profile contacting portion 10B of the S-cam 20 and the right involute cam 30-2 may act in the horizontal direction consistent with the normal line of the two contacting surfaces through the horizontal transferring force of the S-cam.

Continuously, the left involute cam 30-1 pushes the shoe web 71-1 on the left while maintaining the left applying pressure Fleft in the horizontal direction, while the right involute cam 30-2 pushes the right shoe web 71-2 on the right while maintaining the right applying pressure Fright in the horizontal direction. Then, the left shoe web 71-1 and the right shoe web 71-2 are shifted to a horizontal extension state of the shoes, which spread in opposite directions, and the horizontal extension state of the shoes causes braking by pushing the rim 73 and the lining 75.

Therefore, the horizontal transferring force of the S-cam 20 and the left involute cam 30-1 and the horizontal transferring force of the S-cam 20 and the right involute cam 30-2 may prevent the sprag slip generation which causes a risk of forced vibration by the conventional slant transferring force of the S-cam, even if the rotating directions of cam 20 and drum 70 are inconsistent by the back movement of the vehicle, and so on, thereby preventing extreme low frequency noise through the prevention of the sprag slip generation.

Figure 5:
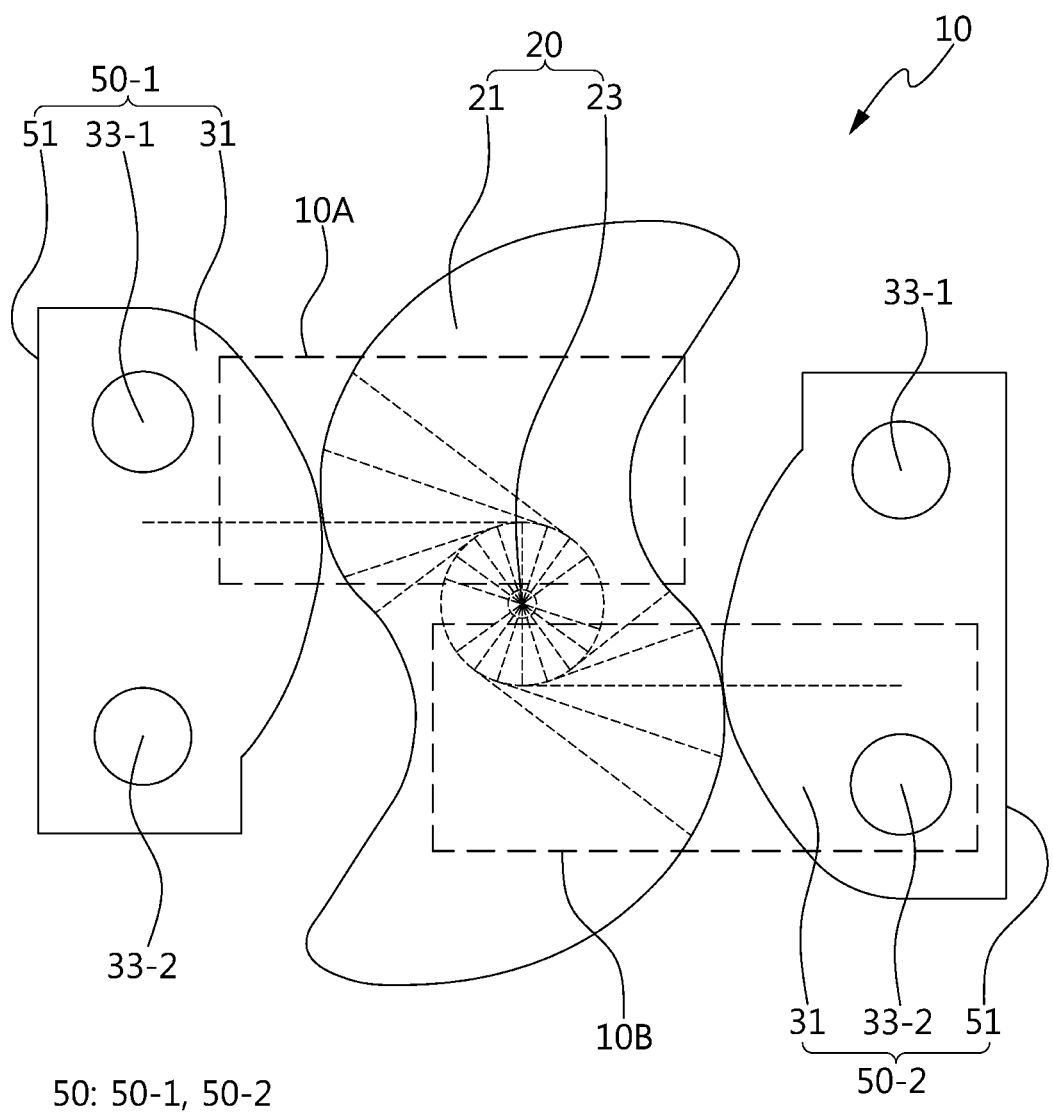
FIG. 5 is the first exemplary variation embodiment of the S-cam unit according to the present disclosure.
Figure 6:
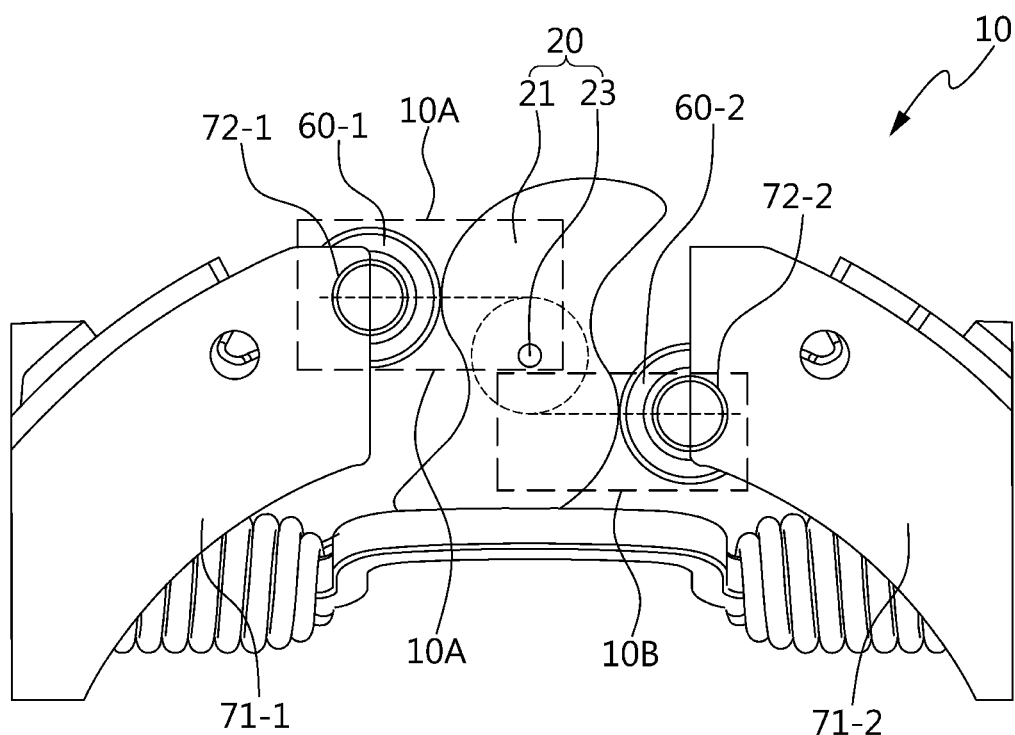
FIG. 6 is the second exemplary variation embodiment of the S-cam unit according to the present disclosure.

Meanwhile, FIGS. 5 and 6 show an example of numerous variations of the S-cam unit 10. Referring to FIG. 5, the S-cam unit 10 may be composed of the S-cam 20 and a first variant horizontal tangential member 50. The first variant horizontal tangential member 50 may be divided into a left variant involute cam 50-1 and a right variant involute cam 50-2.

Each of the left and right variant cam 50-1 and 50-2 may be formed as an involute cam profile body 31 in which upper and lower center holes 33-1 and 33-2 are drilled, and the involute cam profile body 31 may be formed with a straight plane 51 which is cut-off straight, so that the involute tooth profile is formed at only one side.

Thus, each of the left and right variant involutes cams 50-1 and 50-2 may achieve a horizontal transferring force of the S-cam with the engagement of involute tooth profiles forming left and right profile contacting portions 10A and 10B with respect to S-cam 20. Further, by forming the cut-off surface 51 at each of the left and right variant involute cam 50-1 and 50-2 unlike the left and right involute cam 30-1 and 30-2 shown in FIGS. 1 to 4, there is a difference in structure which is suitable for mounting to the left and right shoe webs 71-1 and 71-2, and is advantageous in weight saving and securing a mounting hole space.

Referring to FIG. 6, the S-cam unit 10 may be composed of an S-cam 20 and a second variant horizontal tangential member 80, and the second variant horizontal tangential member 60 may form a circular cross section no involute tooth profile like the horizontal tangential member 30 shown in FIGS. 1 to 4, and may be divided into a left roller 60-1 and a right roller 60-2.

However, each of the left and right shoe webs 71-1 and 71-2 joining each of the left and right rollers 60-1 and 60-2 may form roller grooves 72-1 and 72-2, and the roller groove 72-1 of the right shoe web 71-2 and the roller groove 72-2 of the right shoe web 71-2 are divided into upper and lower portions. For example, when the roller groove 72-1 of the left shoe web 71-1 is formed above the cam pin 23 of the S-cam 20, the roller groove 72-2 of the right shoe web 71-2 is formed below the cam pin 23 of the S-cam 20.

Therefore, each of the left-side roller 60-1 and the right-side roller 60-2 is mounted symmetrically with respect to the center point of the circle in the S-cam 20 so that the common inner tangential line of the basic circle contacted with the S-cam 20 can be horizontal. As a result, the S-cam 20 and the left profile contacting portion 10A of the left roller 60-1 and the S-cam 20 and the right profile contacting portion 10B of the right roller 60-2 contact other through the involute tooth of the cam and the circular exterior diameter of the roller, so that the normal line of the two contacting surfaces is formed in the horizontal direction. As a result, each of the left and right rollers 60-1 and 60-2 is subjected to the horizontal transferring force of the S-cam via the left and right profile contacting portions 10A and 10B for the S-cam 20.

As described above, in the S-cam brake 1 according to the present exemplary embodiment, any one of the left and right involute cams 30-1 and 30-2, the left and right variant involutes cams 50-1 and 50-2, the left and right rollers 60-1 and 60-2 may be symmetrically arranged with respect to the center point of a circle at the left and right sides of S-cam 20 while forming contacting surfaces engaged with the involute tooth profile of the S-cam 20, so that the rotation of the S-cam 20 creates a horizontal expansion state of the shoe with the normal lines of the contacting surfaces as the horizontal direction, thereby achieving the horizontal transferring force of the S-cam, and eliminating the generation of the sprag slip developed to the extremely low-frequency noise through the horizontal transferring force of the S-cam when the S-cam 20 and the drum 70 have different rotational directions thereof.

The exemplary embodiment as discussed previously is merely a desirable embodiment which may enable a person (hereinafter referred to as 'a skilled person in the relevant technology'), who has a typical knowledge in a technology field that the present disclosure belongs to, to execute the present disclosure easily, but the present disclosure is not limited to the aforesaid exemplary embodiment and the attached drawings, and hence this does not result in limiting the scope of right in this disclosure. Therefore, it will be apparent to a skilled person in the relevant technology that several transposition, transformation, and change is possible within a scope of not deviating from the technological thought in the present disclosure and it is obvious that a easily changeable part by a skilled person in the relevant technology is included within the scope of right in the present disclosure as well.

What is claimed is:

1. An S-cam brake, comprising:
   an S-cam unit for braking a drum,
   wherein the S-cam unit includes:
   an S-cam of "S" shape having an involute tooth profile at left and right sides thereof; and
   horizontal tangential members forming contacting surfaces engaged with the involute tooth profile symmetrically around a center point of a circle at the left and right sides of the S-cam, and being spread at the left and right sides with normal lines of the contacting surfaces when the S-cam rotates,
   wherein each of the horizontal tangential members includes the involute tooth profile, and
   wherein an upper center hole and a lower center hole are provided in the horizontal tangential members at an interval, and the horizontal tangential members are arranged symmetrically with respect to a center of the interval.

2. The S-cam brake of claim 1, wherein:
   the horizontal tangential members form a straight plane; and
   the straight plane is formed on an opposite side surface not forming the involute tooth profile.

3. The S-cam brake of claim 2, wherein:
   an upper center hole and a lower center hole are provided in the horizontal tangential members at an interval; and
   the upper center hole and the lower center hole are positioned inside the cut-off surface.

4. The S-cam brake of claim 3, wherein: a fixing member is fastened to each of the upper center hole and the lower center hole.

5. The S-cam brake of claim 2, wherein:
   the horizontal tangential members are divided into a left variant involute cam and a right variant involute cam;
   the left variant involute cam forms the contacting surface at the left side of the S-cam; and
   the right variant involute cam forms the contacting surface at the right side of the S-cam.

6. The S-cam brake of claim 5, wherein each of the positions of the left variant involute cam and the right variant involute cam is arranged with respect to the center of the S-cam.

7. The S-cam brake of claim 1, wherein the horizontal tangential members each include a circular exterior diameter.

8. The S-cam brake of claim 7, wherein:
the horizontal tangential members are divided into a left roller and a right roller;
the left roller forms the contacting surface at the left side of the S-cam; and
the right roller forms the contacting surface at the right side of the S-cam.

9. The S-cam brake of claim 8, wherein each of the positions of the left roller and the right roller is arranged with respect to the center of the S-cam.

10. The S-cam brake of claim 1, wherein:
the horizontal tangential members are divided into a left involute cam and a right involute cam;
the left involute cam forms the contacting surface at the left side of the S-cam; and
the right involute cam forms the contacting surface at the right side of the S-cam.

11. The S-cam brake of claim 10, wherein each of the positions of the left involute cam and the right involute cam is arranged with respect to the center of the S-cam.

12. The S-cam brake of claim 1, wherein:
the S-cam is engaged with a slack adjuster through a cam pin; and
the cam pin acts as a rotation center of the S-cam by movement of the slack adjuster.

13. The S-cam brake of claim 12, wherein the slack adjuster is operated as a brake chamber receiving the supply of compress air when a brake pedal is operated.

14. The S-cam brake of claim 1, wherein a fixing member is fastened to each of the upper center hole and the lower center hole.

15. The S-cam brake of claim 1, wherein the horizontal tangential members form the contacting surfaces without protruding beyond the abrasion limit line of a lining provided at the drum.

* * * * *